United States Patent
Ota et al.

(10) Patent No.: US 6,236,465 B1
(45) Date of Patent: May 22, 2001

(54) GRADATION REPRODUCTION

(75) Inventors: Ken Ota, Sunnyvale, CA (US);
Shinichi Takemoto, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/037,964

(22) Filed: Mar. 11, 1998

(30) Foreign Application Priority Data

Mar. 12, 1997 (JP) .................................................. 9-057674

(51) Int. Cl.⁷ .................................................. H04N 1/52
(52) U.S. Cl. ........................ 358/1.9; 358/534; 358/460
(58) Field of Search .................................. 358/534, 535, 358/536, 460, 456, 457, 458, 459, 466, 298, 454, 518, 1.9; 382/275, 270, 277

(56) References Cited

U.S. PATENT DOCUMENTS

| | | |
|---|---|---|
| 4,342,051 | 7/1982 | Suzuki et al. . |
| 4,517,606 | 5/1985 | Yokomizo et al. . |
| 4,916,545 * | 4/1990 | Granger ................. 358/456 |
| 4,967,211 | 10/1990 | Colby et al. . |
| 5,041,920 | 8/1991 | Hayes et al. . |
| 5,099,259 | 3/1992 | Hirahara et al. . |
| 5,172,248 * | 12/1992 | Urabe et al. ........... 358/456 |
| 5,258,780 | 11/1993 | Ema et al. . |
| 5,270,827 | 12/1993 | Kobayashi et al. . |
| 5,537,223 * | 7/1996 | Curry ..................... 358/460 |
| 5,790,272 | 8/1998 | Goto et al. ............. 358/460 |
| 5,828,397 * | 10/1998 | Goto et al. ............. 347/131 |

FOREIGN PATENT DOCUMENTS 7-115538    5/1995   (JP) .

OTHER PUBLICATIONS

Halftone Reproduction on Digital Printer Based on Eletrophotography (III); Naota Kawamura et al.; Canon Inc., Business Machines Research Laboratory; Nov. 22, 1995; pp. 31–44.

* cited by examiner

Primary Examiner—Scott Rogers
(74) Attorney, Agent, or Firm—Burns, Doane, Swecker & Mathis, LLP

(57) ABSTRACT

In an image processor, a storage device stores matrix patterns for changing dot area ratio according to gradation level. When a gradation image is reproduced, a pattern is read by pointing X and Y addresses to generate a pattern image in correspondence to gradation data of color components in a color image. As to a pattern stored in the storage device, X address and/or Y address can be converted for changing reading order of the pattern. For example, when the gradation image is reproduced, the same pattern is used for gradation data of two color components.

13 Claims, 9 Drawing Sheets

PSB

GRADATION REPRODUCTION

This application is based on application No. 9-57674/1997 filed in Japan, the content of which is incorporated hereinto by reference.

BACKGROUND OF THE INVENTION

1. Field of the Invention

The present invention relates to gradation reproduction, used in for example, a digital copying machine or a printer, for reproducing a gradation image by using a matrix pattern which changes a dot area ratio according to gradation level.

2. Description of Related Art

Gradation reproduction methods have been proposed for recording a half-tone image for an apparatus such as a is printer or a digital copying machine by using various area gradation such as density pattern method or dither method. In the density pattern method, an image data of a pixel in an original image is compared with a threshold value at each dot in an m*n matrix pattern (density pattern), and gradation image is reproduced by outputting a pattern image having a dot area ratio in correspondence to the gradation of the pixel. In the dither method, an image data of each pixel in an original image is compared with a threshold value at a corresponding dot in an m*n matrix pattern (threshold matrix), and gradation image is reproduced by outputting a pattern image having a dot area ratio in correspondence to the gradation of each pixel. Further, a gradation reproduction method (IH method) is proposed by combining a matrix modified based on a threshold matrix of fattening type with pulse width modulation of laser beam exposure in an electrophotographic process. The number of gradation levels is as large as m*m*L*0.5+1 including white where L represents dot division number in pulse width modulation and m*m represents matrix size. Therefore, an image of higher quality than the previous dither method can be obtained.

In these gradation reproduction methods, gradation is reproduced by controlling the total exposure time by a is light source or the number of dots for light emission in a unit area. On the other hand, a generalized dither method is proposed for gradation reproduction by controlling the exposure position (Japanese Patent laid open Publication 7-115538/1995). This uses a fact that even if the total exposure time is the same, the accumulated energy is different so that the image area becomes different when the exposure time is different.

In any of the gradation reproduction methods, a matrix pattern for changing dot area ratio according to the gradation is stored in a storage device, and the pattern is read from the storage device by pointing the X and Y addresses.

However, it is a problem that the storage capacity of the storage device for storing the pattern is large for the gradation reproduction methods because this increases the cost thereof. As one pattern is needed for each gradation level, 256 patterns are provided for 256 gradation levels. Further, gradation reproduction of a color image, different patterns are needed for the four color components of cyan, magenta, yellow and black, or the memory capacity becomes four times that of one color. Further, because higher image quality is desired recently, patterns exclusive for each image type such as character image or photograph image are needed. In this case, the storage capacity is increased further.

SUMMARY

An object of the present invention is to provide a gradation reproducing method using a smaller memory capacity of a storage device for storing patterns for gradation reproduction.

In an apparatus of the invention, a gradation image is reproduced by arranging dots in horizontal and vertical directions, a storage device stores a plurality of patterns in correspondence to gradation levels, each of the patterns having a plurality of cells arranged as a matrix. The cells are arranged differently in the patterns of the gradation levels, and a pattern selector selecting one of the patterns stored in the storage device in correspondence to a gradation level of an image to be reproduced. A first address signal generator generates an address signal in synchronization to image reproduction performed in a vertical direction, and a second address signal generator generates an address signal in synchronization to image reproduction performed in a horizontal direction. A converter converts the address signals received from the first and/or second address signal generators for addressing a cell of the pattern in the storage device selected by the pattern selector, and image reproduction is performed in correspondence to the cell addressed by said converter. When a color image is reproduced, for is example, the same pattern can be read by changing the reading order from the pattern by the address conversion.

An advantage of the invention is that the memory capacity for the storage device storing a pattern for gradation reproduction is decreased and the cost of the memory is decreased.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
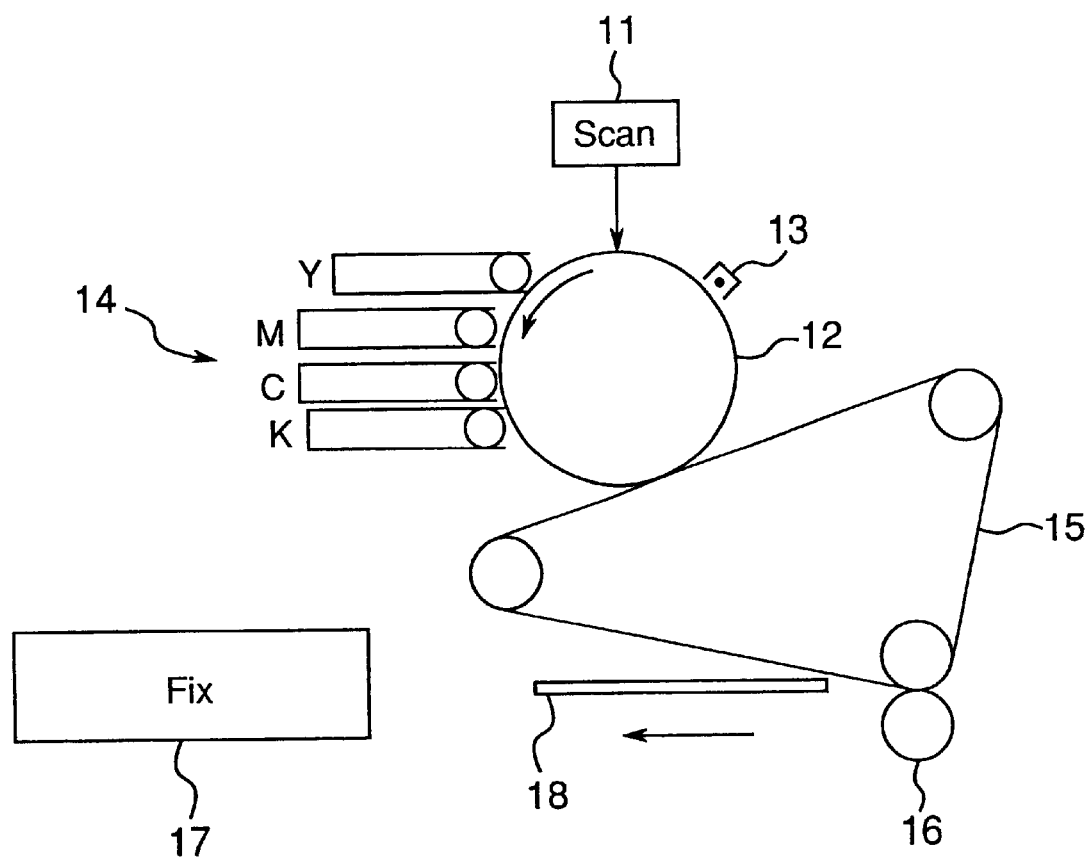
FIG. 1 is a diagram of a full color printer.

Referring now to the drawings, wherein like reference characters designate like or corresponding parts throughout the several views, FIG. 1 shows a full-color electrophotographic printer of an embodiment of the invention including an optical scan system 11, a photoconductor drum 12, a sensitizing charger 13, a development unit 14, an intermediate transfer medium 15, a transfer device 16 and a fixing device 17. The photoconductor drum 12 is rotated at a constant speed and its surface is charged uniformly by the charger 13 at a predetermined potential. Then, a light beam (laser beam) emitted from the optical scan system 11 is focused on the photoconductor drum 12, to form an electrostatic latent image thereon. The latent image is developed by the development unit 14 with yellow, magenta, cyan and black toners sequentially to form toner images. The toner images of the four colors are transferred onto the intermediate transfer medium 15 sequentially, and a resultant color image with synthesized colors is formed on the intermediate transfer medium 15. The color image is transferred on a paper sheet 18 by the transfer device 16 and fixed by the fixing device 17.

Figure 2:
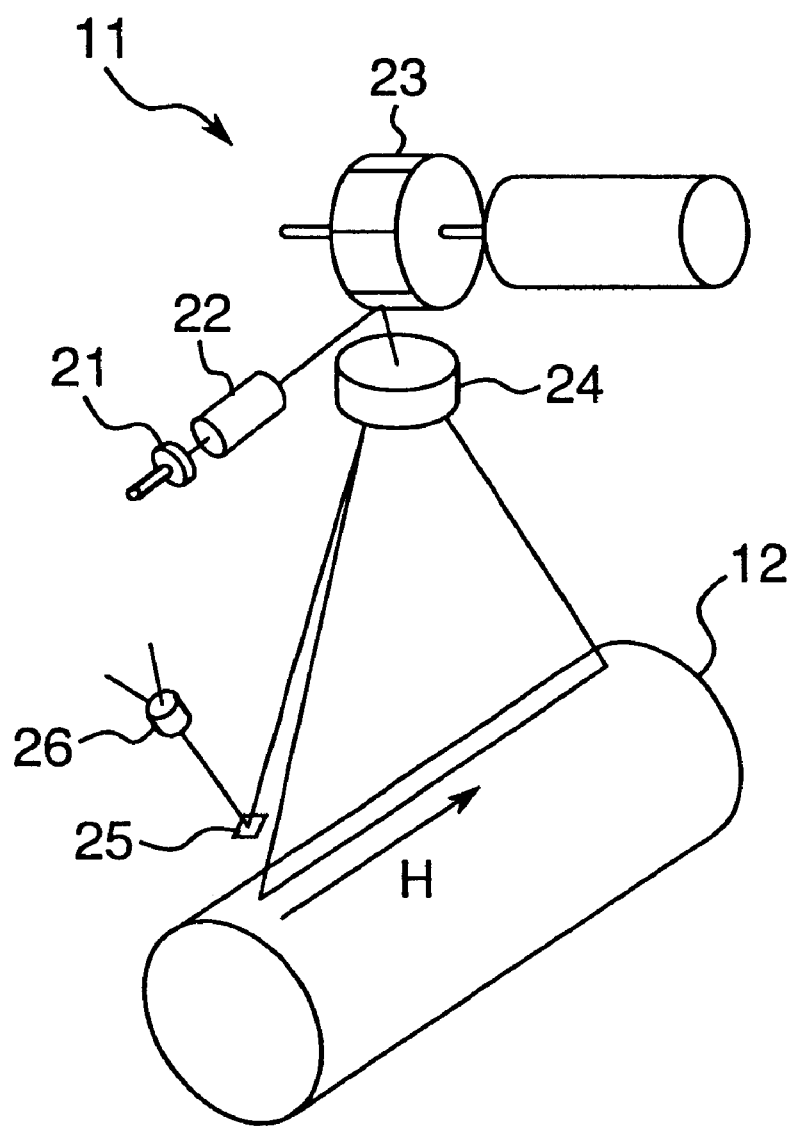
FIG. 2 is a perspective view of a scanning optical system.

FIG. 2 shows the optical scan system 11. A laser diode 21 emits the laser beam whose intensity is modulated according to image information obtained for example from a memory in a controller (not shown). The laser beam is collimated by a collimating lens 22, and deflected by a rotating polygon mirror 23. The deflected laser beam is focused by a lens 24 called as f-θ lens to form a latent image on the photoconductor drum 12. In the beam scan, a mirror 25 reflects the light near a start end of each scan line for the laser beam toward a detector 26. A detection signal from the detector 26 is used as a synchronization signal for scan along horizontal direction.

Figure 3:
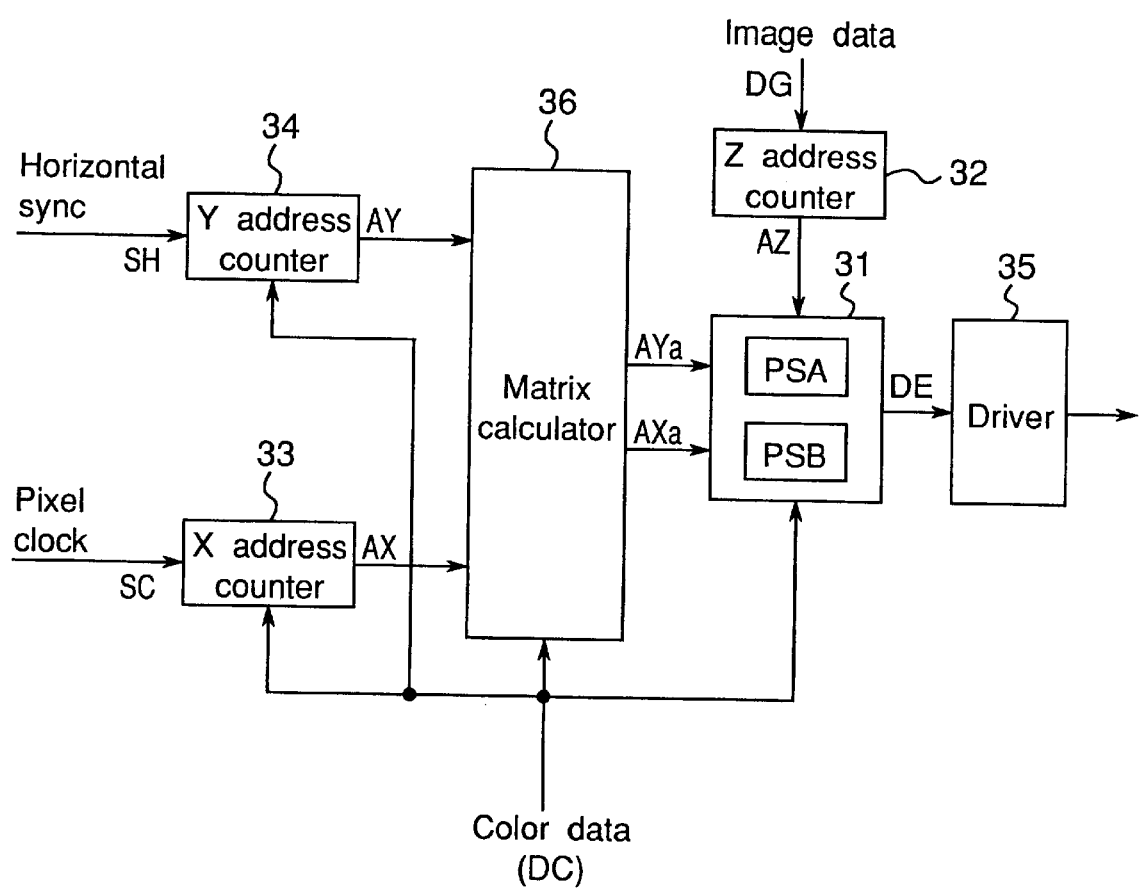
FIG. 3 is a block diagram of a modulation circuit for a laser diode.

FIG. 3 shows a block diagram of a modulation circuit for driving the laser diode 21, and it includes a pattern read only memory (ROM) 31, a Z address counter 32, an X address counter 33, a Y address counter 34, a driver 35 for driving the laser diode 21 and a matrix calculator circuit 36. It is a feature of the modulation circuit that the pattern ROM 31 stores two kinds of pattern groups PSA and PSB. The patterns PSA and PSB are a set of density patterns PS for the density pattern method of the number in correspondence to that of the gradation levels. One pattern PS is pointed by the Z address counter 32 by the gradation level according to the gradation data (image data). Each element (cell) in the matrix of the pointed pattern PS is designated with X and Y addresses from the matrix calculator circuit 36, and the value of the element is read as 1-bit data DE to be sent to the driver 35 for driving the laser diode 21.

The first pattern group PSA consists of many patterns PSA0, PSA1, PSA2 and so on of a 6*24 matrix, and the second pattern group PSB consists of many patterns PSB0, PSB1, PSB2 and so on of a 17*68 matrix. The number of the patterns PSA0, PSA1, PSA2 and so on in the first group, and PSB0, PSB1, PSB2 and so on in the second group are equal to the number of gradation levels. For example, if the number of gradation levels is 256, the number of patterns in each of the pattern groups PSA and PSB is 256, while if the number of gradation levels is 64, each pattern group PSA and PSB has 64 patterns. A pattern belonging to the group PSA or PSB may be referred to as "pattern PSA" or "pattern PSB". A pattern belonging to the two groups PSA and PSB may be referred to as "pattern PS".

A color data DC is a 2-bit data which represents four color components of yellow, magenta, cyan and black, and it determines which of the pattern groups PSA and PSB is read. The conversion by the address converter 36 is selected according to color data DC. The pattern group PSA is read for black and yellow, while the pattern group PSB is read for cyan and magenta.

The Z address "AZ" is equal to the gradation value (density value) of image data on a color component of a pixel. The Z address counter 32 generates Z address "AZ" based on the image data read from an image memory (not shown) or the like for each image data of a color component. Z address "AZ" outputted from the Z address counter 32 is sent to the storage device 31 to designate which pattern PSA, PSB is read in the pattern group PSA, PSB. For example, if the gradation value is 21 on image data of color component of black, a pattern PSA in correspondence to the gradation value 21 is read from the pattern group PSA.

As to the pattern designated by the Z address counter 32, each element (cell) in the matrix is pointed by the X address "AXa" and Y address "AYa" outputted from the matrix calculator circuit 36, and the value at the designated cell is read as 1-bit data DE.

Figure 4A:
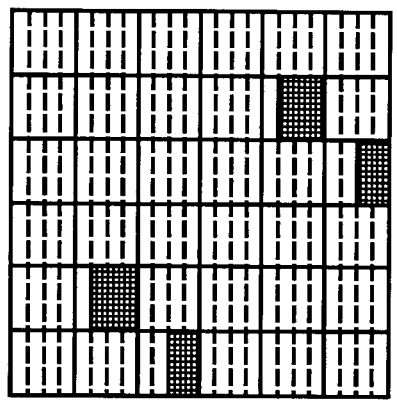
FIGS. 4A, 4B and 4C are diagrams of an example of pattern.
Figure 4B:
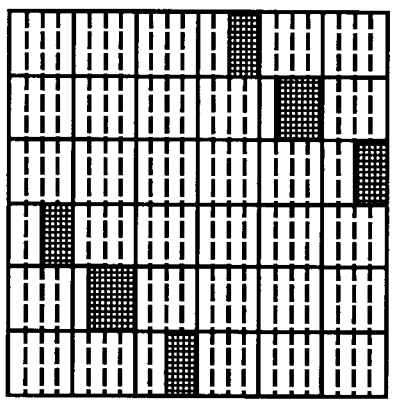
Figure 4C:
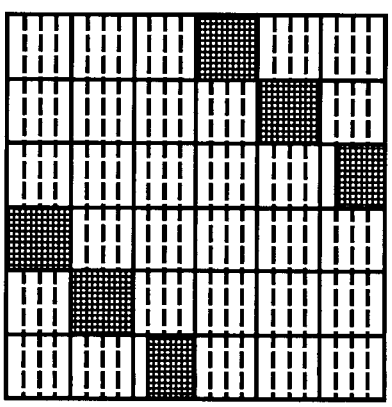
Figure 5A:
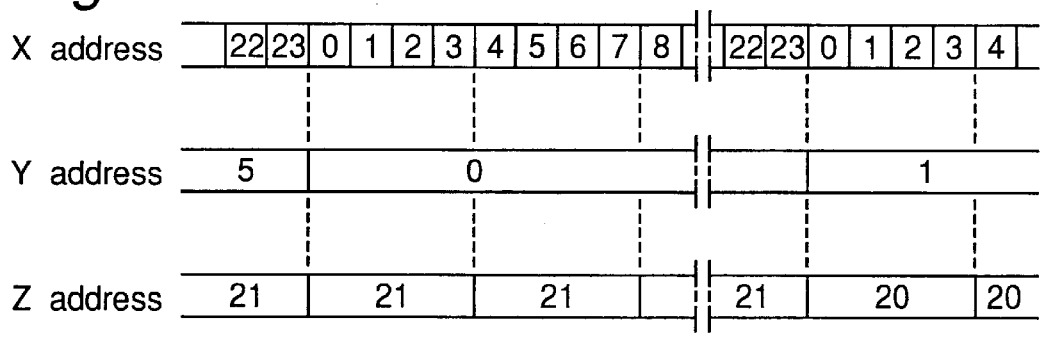
FIGS. 5A, 5B, 5C and 5D are timing charts of addressing.
Figure 5B:
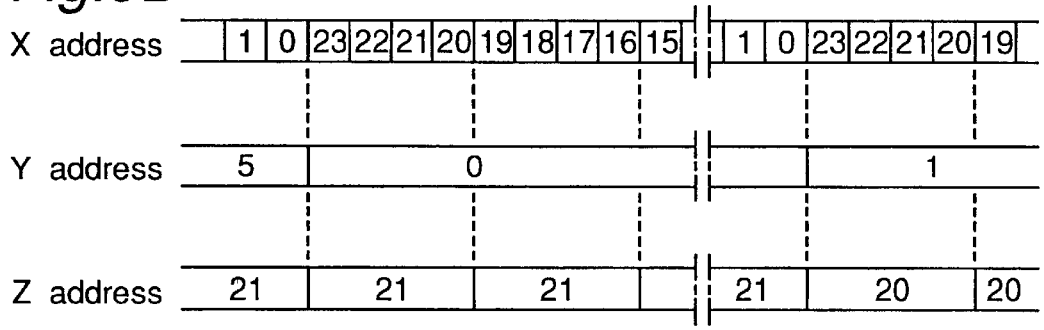
Figure 5C:
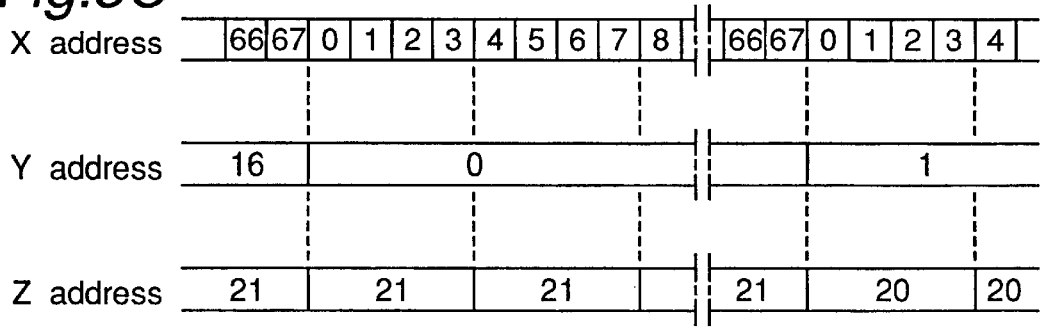
Figure 5D:
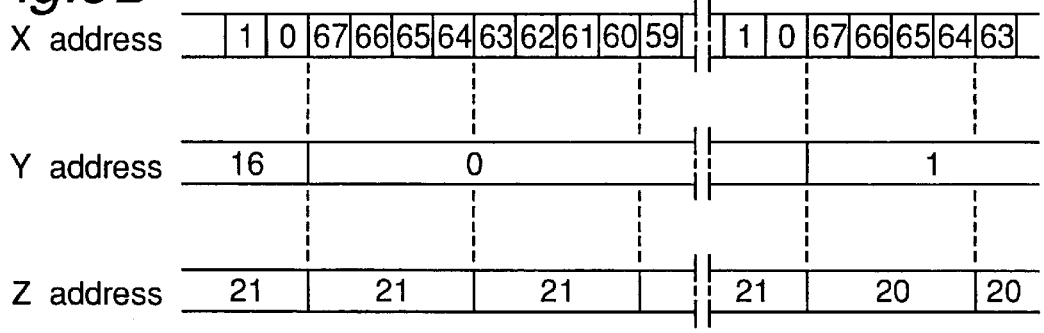
Figure 6A:
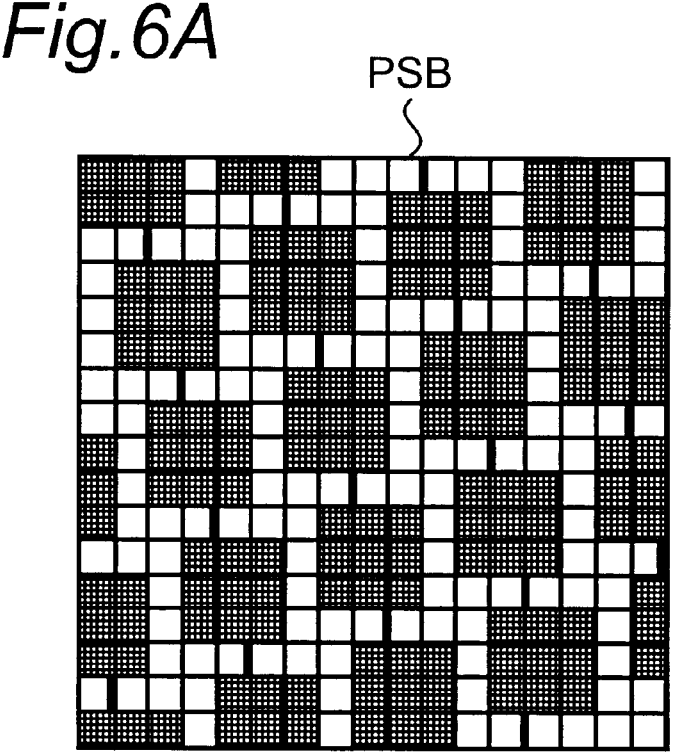
FIGS. 6A and 6B are diagrams of another example of pattern.
Figure 6B:
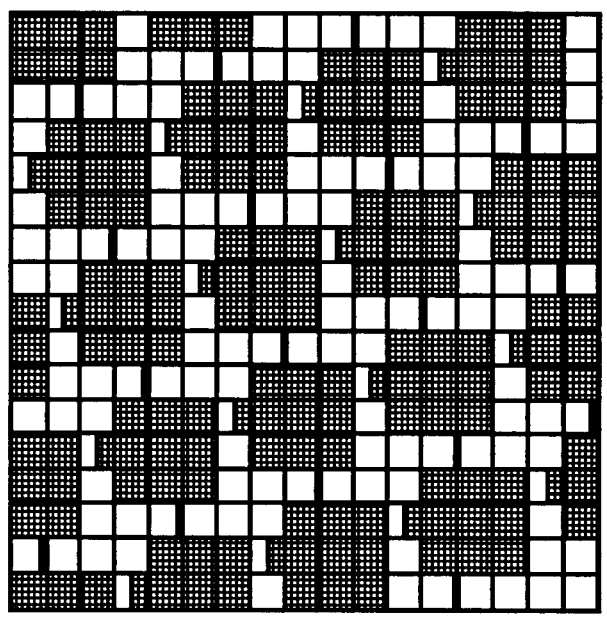

The X address counter 33 counts pixel clock signals SC, and the count is outputted as X address "AX". The pixel clock signal SC is a clock signal having a frequency of k times the frequency of image clock signal (wherein k is a division number of a pixel). That is, while one pixel data DG is read, k pixel clock signals SC are received. The X address counter 33 repeats counting within a predetermined value according to the number of elements EM arranged in the lateral direction (or line direction, horizontal direction or is main scan direction) of the pattern. The range of counting is changed in correspondence to the color data DC. For example, if the size of the pattern PS is 6*24, as shown in FIGS. 4A–4C, the counting of X address is repeated in the range of 0 to 23, as shown in FIGS. 5A and 5B. If the size of the pattern PS is 17*68, as shown in FIGS. 6A and 6B, the counting of X address is repeated in the range of 0 to 67, as shown in FIGS. 5C and 5D.

The Y address counter 34 counts horizontal synchronization signals SH, and the count is outputted as Y address AY. The Y address counter 34 repeats counting within a predetermined value according to the number of elements EM arranged in the longitudinal direction (or column direction, vertical direction or subscan direction) of the pattern. The range of counting is changed in correspondence to the color data DC. For example, if the size of the pattern PS is 6*24, the counting is repeated in the range of 0 to 5 as shown in FIGS. 5A and 5B. If the size of the pattern PS is 17*68, the counting is repeated in the range of 0 to 16 as shown in FIGS. 5C and 5D.

The matrix calculator circuit 36 performs matrix calculation for address conversion according to a prescribed relation for the X address AX outputted from the X address counter 33 and the Y address AY outputted from the Y address counter 34 in correspondence to the color data DC. The matrix calculator circuit 36 outputs X address "AXa" and Y address "AYa" after address conversion to the storage device 31. X address before and after conversion may simply be denoted as X or Xa, and Y address before and after conversion may simply be denoted as Y or Ya. A pattern different from the pattern PS stored in the storage device 31 can be read by the matrix calculation. By the address conversion, for example, the pattern PS is inverted symmetrically between left and right, inverted symmetrically relative to a diagonal, inverted symmetrically upside down, or rotated.

Figure 7:
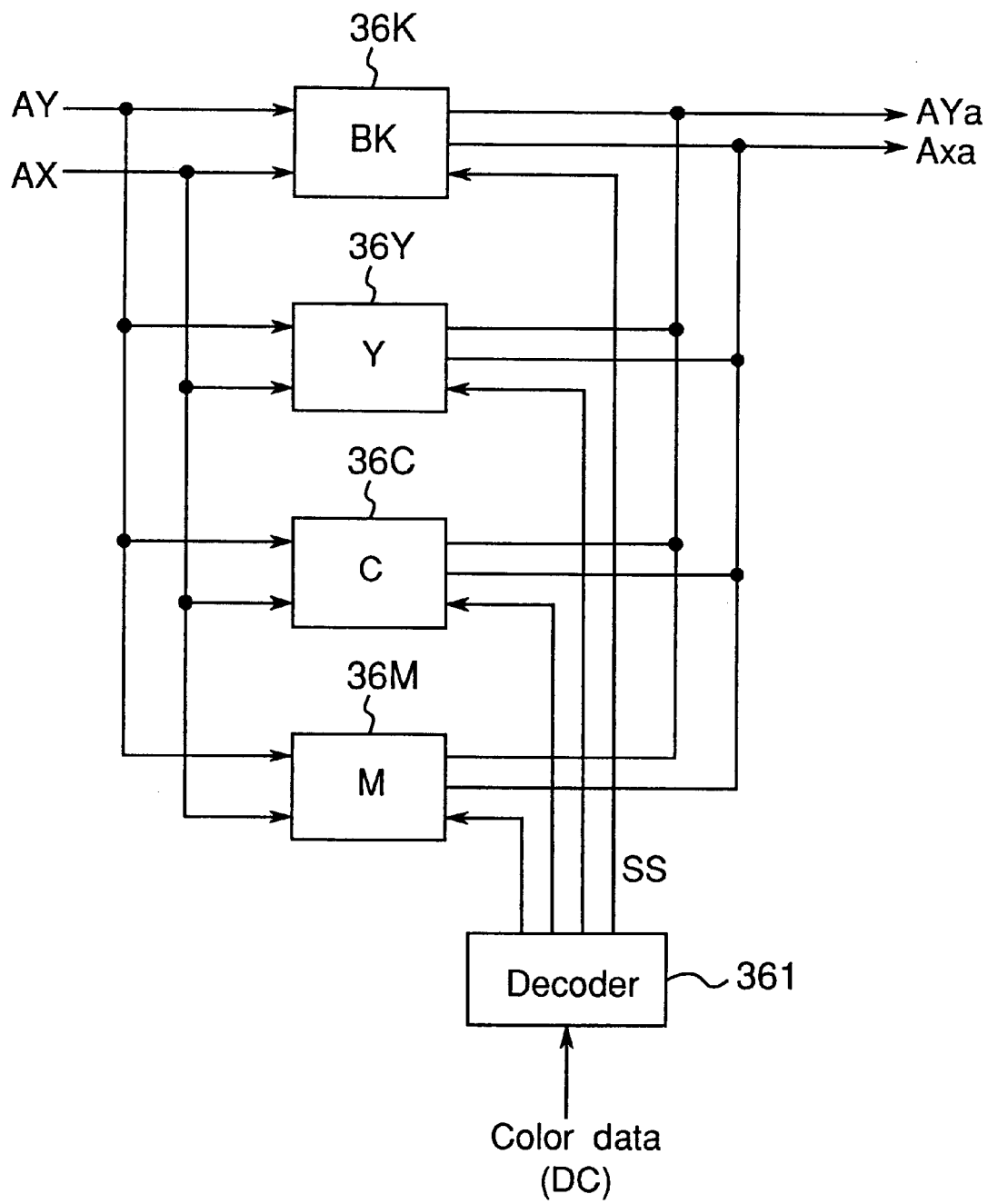
FIG. 7 is a diagram for illustrating the content of matrix calculation in the matrix calculator circuit.

As shown in FIG. 7, the matrix calculator circuit 36 has matrix calculation sections 36K, 36Y, 36C and 36M for black, yellow, cyan and magenta. One of the matrix calculation sections 36K, 36Y, 36C and 36M is selected according to selection signal SS obtained by decoding the color data DC by a decoder 361.

The matrix calculation section 36K for black performs following calculation:

$$Xa=X,$$

and $$Ya=Y. \tag{1}$$

The matrix calculation section 36Y for yellow performs following calculation:

$$Xa = 23-X,$$

and $$Ya = Y. \tag{2}$$

The matrix calculation section 36C for cyan performs following calculation:

$$Xa = X,$$

and $$Ya = Y. \tag{3}$$

The matrix calculation section 36M for magenta performs following calculation:

$$Xa = 67-X,$$

and $$Ya = Y. \tag{4}$$

That is, the matrix calculation sections 36K and 36C for black and cyan perform no address conversion. On the other hand, the matrix calculation sections 36Y and 36M for yellow and magenta perform address conversion by counting Y address from the reverse direction. Therefore, if the color component is black, the pattern PSA is read without conversion. If the color component is cyan, the pattern PSA is also read without conversion. On the other hand, if the color component is yellow, the pattern PSA is read symmetrically relative to a vertical line located at the center. If the color component is magenta, the pattern PSA is also read symmetrically relative to a vertical line located at the center. Thus, if the color component is yellow or magenta, the pattern PSA is read in a reversed state symmetrical between left and right.

Thus, as to black and yellow, black image is read without address conversion, while yellow image is read in line symmetry with respect on the central vertical line. Thus, an image of linear patterns is obtained at low densities wherein lines are perpendicular to each other. On the other hand, as to cyan and magenta, an obtained image of linear patterns has a screen angle different between them and from that of black and yellow. Therefore, texture noises due to shift of overlapping of the gradation image of the color components are prevented to occur, and image quality is improved.

FIGS. 4A–4C show examples of patterns PS of 6*24 matrix in the pattern group PSA, and FIGS. 6A–6B show examples of patterns PS of 17*68 matrix in the pattern group PSB stored in the pattern ROM 31. A pattern PS consist of matrices of m*(m*k) size obtained by dividing each dot DT in a square matrix of m*m dots into k in the lateral direction. Each element EM has a value of "0" or "1". In FIGS. 4A–4C, m=6 and k=4, and in FIGS. 6A and 6B, m=17 and k=4. If the value of an element is "0", the laser diode 21 is turned off, while if the value is "1", the laser diode 21 is turned on. When the laser diode is turned on, a point on the photoconductor drum 12 is exposed to decrease the potential, and toners adhere thereto to blacken the paper sheet. On the other hand, when the laser diode is turned off, a corresponding point on the paper sheet in the remains white. Then, an element for "0" is also referred to as white element EMW, while an element for "1" is also referred to as black element EMB.

Figure 8A:
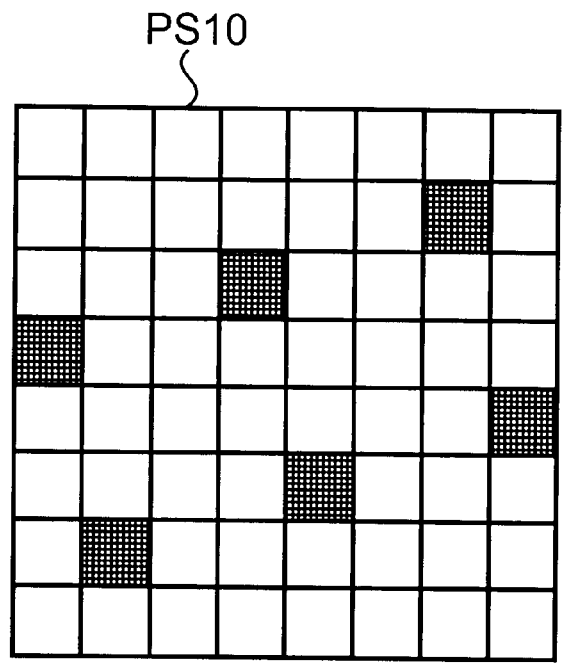
FIGS. 8A and 8B are diagrams of a different example of pattern.

Next, another example of address conversion in the matrix calculator circuit 36 is explained. FIG. 8A shows another example of pattern PS of 8*8 matrix. The matrix calculator circuit 36 calculates as follows:

$$Xa = Y,$$

and $$Ya = X \tag{5}$$

Figure 8B:
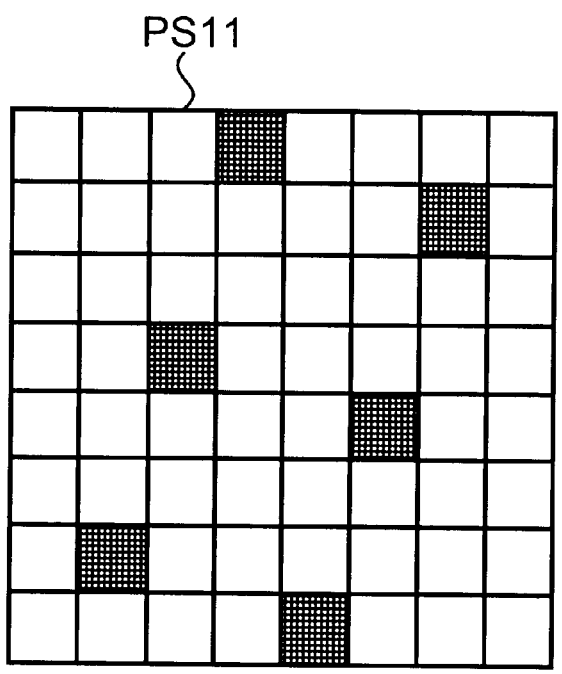

That is, the matrix calculator circuit 36 performs address conversion to exchange X and Y addresses. Then, the pattern PS is read from the pattern ROM 31 in line symmetry relative to a diagonal line. For example, the pattern PS10 shown in FIG. 8A is converted according to Eq. (5) to result in the pattern PS11 shown in FIG. 8B.

The patterns PS shown in FIGS. 4A–4C and 6A–6B are used for the generalized dither method proposed wherein address conversion as shown in FIG. 7 is preferable to reverse between left and right. The reason is that because a position of black elements is not changed in the vertical direction though it is changed in the horizontal direction. Thus, the light emitting pattern of the laser diode 21 is not changed, and the predetermined density is realized. On the other hand, if a position of the elements is reversed relative to a diagonal, it is changed in the vertical direction. Thus, the light emitting pattern of the laser diode 21 is changed, and the predetermined density may not be realized. If the pattern PS without divided dots is used, there is no problem on the reversal relative to the diagonal.

Figure 9:
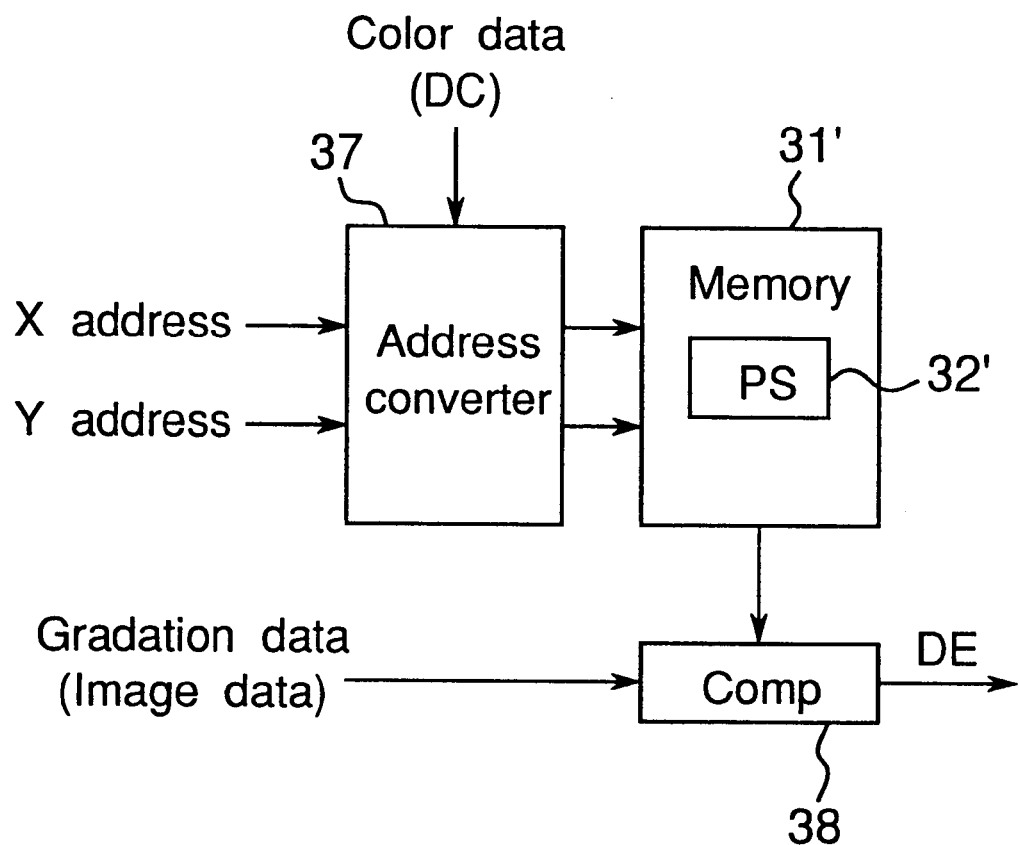
FIG. 9 is another diagram for illustrating the principle of gradation reproduction of the invention.

In the above-mentioned embodiment, pattern groups PSA, PSA of density patterns used for the density pattern method are stored in the pattern ROM 31. However, patterns of threshold matrices (PS) 32' may also be stored in a pattern ROM 31' as in the matrix calculator circuit shown in FIG. 9 schematically. That is, the storage device 31' stores threshold matrices used for the dither method, and an address converter 37 converts the X and Y addresses according to the color data, and the gradation data at the converted addresses is compared by a comparator 38 with a threshold read from the storage device 31' for each element of the matrix, to output a binarized 1-bit data DE.

The patterns stored in the pattern ROM 31, 31' may be various other patterns including a pattern for the ID method, a pattern for the generalized dither method or the like. It is also possible that a plurality of types of patterns may be stored in the storage device.

In the above-mentioned embodiment, two patterns may be read from one pattern PS stored in the pattern ROM 31, and patterns PS for the four color components can be obtained from the two patterns. Therefore, it is an advantage of the embodiment that the storage capacity for storing the patterns for gradation reproduction can be decreased, and the cost thereof is reduced.

Even if the same storage capacity as the conventional memory device is used, patterns of the types twice the conventional patterns can be stored. Therefore, various kinds of patterns, for example, for character images and half-tone images can be obtained without increasing the storage capacity.

In the above-mentioned embodiment, matrix calculation for address conversion is performed by the matrix calculator circuit 36. However, address conversion may also be performed by the X address counter 33 or the Y address counter 34, by counting only in the up or down direction. The conversion may also be upside down inversion or rotation by a predetermined angle of the pattern PS. Further, only one of the X and Y addresses may be converted in the address conversion.

The matrix calculation circuit 36 is made of digital circuit, but matrix calculation may be performed by a software program or a high speed calculation element operated by a software program.

The size of the matrix, the type of the pattern or the number of the types of pattern groups may be modified is appropriately. A random access memory or a flash memory may also be used instead of read only memory for storing patterns. All or part of the matrix calculator circuit 36, the modulation circuit 30 or the image reader 1 may also be modified appropriately on the structure, the content of data processing or the order of processing.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An apparatus for reproducing a gradation image by arranging dots in horizontal and vertical directions comprising:
   a storage device for storing a plurality of patterns in correspondence to gradation levels, each of the patterns having a plurality of cells arranged as a matrix, the cells being arranged differently in the patterns of the gradation levels;
   a pattern selector selecting one of the patterns stored in said storage device in correspondence to a gradation level of an image to be reproduced, the selected pattern being used for at least two color components;
   a first address signal generator which generates an address signal in synchronization to image reproduction performed in a vertical direction;
   a second address signal generator which generates an address signal in synchronization to image reproduction performed in a horizontal direction; and
   a converter which converts the address signals received from said first and/or second address signal generators for addressing a cell of the pattern in said storage device selected by said pattern selector so that the addressed cell of the selected pattern is different between the at least two color components, wherein image reproduction is performed in correspondence to the cell addressed by said converter.

2. The apparatus according to claim 1, wherein said first address signal generator includes a first counter counting a dot clock generated in correspondence to dots aligned in the horizontal direction, and said second address signal generator includes a second counter counting horizontal synchronization signals generated synchronously with image reproduction in the vertical direction.

3. The apparatus according to claim 1, wherein said converter has a plurality of conversion formats in correspondence to an attribute of the image to be reproduced.

4. The apparatus according to claim 3, wherein the attribute includes a color of the image to be reproduced.

5. The apparatus according to claim 4, wherein said converter performs no address conversion for reproduction of a first color according to a first conversion format for the address signals received from said first and/or second address signal generators, and said converter performs address conversion for reproduction of a second color different from the first color according to a second conversion format by converting the addresses in the pattern.

6. The apparatus according to claim 1, wherein the converter converts the address signals received from said first and/or second address signal generators to converted address signals.

7. A method for reproducing a gradation image by arranging dots in horizontal and vertical directions comprising the steps of:
   storing a plurality of patterns in correspondence to gradation levels, each of the patterns having a plurality of cells arranged as a matrix, the cells being arranged differently in the patterns of the gradation levels;
   selecting one of the stored patterns in correspondence to a gradatin level of an image to be reproduced, and using the selected pattern for at least two color components;
   generating a first address signal in synchronization to image reproduction performed in a vertical direction;
   generating a second address signal in synchronization to image reproduction performed in a horizontal direction; and
   converting the first and/or second address signals received for addressing a cell of the selected pattern so that the addressed cell of the selected pattern is different between the at least two color components, wherein image reproduction is performed in correspondence to the addressed cell.

8. The method according to claim 7, wherein said generating step for the first address signal includes the step of counting a dot clock generated in correspondence to dots aligned in the horizontal direction, and said generating step for the second address signal includes the step of counting horizontal synchronization signals generated synchronously with image reproduction in the vertical direction.

9. The method according to claim 7, in said converting step, the first and/or second address signals are converted according to a plurality of conversion formats in correspondence to an attribute of the image to be reproduced.

10. The method according to claim 9, wherein the attribute includes a color of the image to be reproduced.

11. The method according to claim 10, wherein in said conversion step, conversion is performed for reproduction of a first color according to a first conversion format without converting the addresses in the pattern, and for a second color different from the first color according to a second conversion format by converting the addresses in the pattern.

12. The method according to claim 7, wherein the converting step includes converting the first and/or second address signals received for addressing a cell of the selected pattern into converted address signals.

13. An apparatus for reproducing a gradation image by arranging dots in horizontal and vertical directions comprising:
   a storage device for storing a patterns having a plurality of threshold values arranged as a matrix, the pattern being used for at least two color components;
   a first address signal generator which generates an address signal in synchronization to image reproduction performed in a vertical direction;
   a second address signal generator which generates an address signal in synchronization to image reproduction performed in a horizontal direction; and
   a converter which converts the address signals received from said first and/or second address signal generators for addressing a threshold value of the pattern in said storage device so that the addressed threshold value of the pattern is different between the at least two color components, wherein image reproduction is performed by comparison between a gradation data and the addressed threshold value.

* * * * *